US011141697B2

(12) United States Patent
Chen et al.

(10) Patent No.: US 11,141,697 B2
(45) Date of Patent: Oct. 12, 2021

(54) CATALYST ARTICLE, METHOD AND USE

(71) Applicant: JOHNSON MATTHEY PUBLIC LIMITED COMPANY, London (GB)

(72) Inventors: Hai-Ying Chen, Wayne, PA (US); Eric Tyo, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 39 days.

(21) Appl. No.: 16/864,224

(22) Filed: May 1, 2020

(65) Prior Publication Data

US 2020/0346166 A1 Nov. 5, 2020

Related U.S. Application Data

(60) Provisional application No. 62/842,651, filed on May 3, 2019.

(51) Int. Cl.
| | |
|---|---|
| *B01D 53/94* | (2006.01) |
| *B01J 21/04* | (2006.01) |
| *B01J 23/46* | (2006.01) |
| *B01J 23/58* | (2006.01) |
| *B01J 35/04* | (2006.01) |
| *B01J 35/10* | (2006.01) |
| *F01N 3/10* | (2006.01) |
| *F01N 3/28* | (2006.01) |

(52) U.S. Cl.
CPC ............ *B01D 53/945* (2013.01); *B01J 21/04* (2013.01); *B01J 23/464* (2013.01); *B01J 23/58* (2013.01); *B01J 35/04* (2013.01); *B01J 35/1014* (2013.01); *B01J 35/1019* (2013.01); *B01J 35/1061* (2013.01); *F01N 3/101* (2013.01); *F01N 3/28* (2013.01); *B01D 2255/1023* (2013.01); *B01D 2255/1025* (2013.01); *B01D 2255/2042* (2013.01); *B01D 2255/908* (2013.01); *B01D 2255/9022* (2013.01); *B01D 2255/9155* (2013.01); *F01N 2370/02* (2013.01)

(58) Field of Classification Search
CPC .............. B01D 53/9445; B01D 53/945; B01D 53/9468; B01D 2255/102; B01D 2255/9022; B01D 2255/908; B01D 2258/012; B01D 2258/014; B01J 23/40; F01N 3/101; F01N 2250/12; F01N 2250/14; F01N 2570/16
See application file for complete search history.

(56) References Cited

U.S. PATENT DOCUMENTS

| | | | | |
|---|---|---|---|---|
| 6,008,155 A | * | 12/1999 | Terada | ............... B01D 53/9418 502/355 |
| 8,173,087 B2 | * | 5/2012 | Wei | ......................... F01N 3/033 423/213.2 |
| 9,156,027 B2 | * | 10/2015 | Imoto | ...................... B01J 23/44 |
| 2011/0014101 A1 | | 1/2011 | Suzuki et al. | |
| 2012/0270730 A1 | * | 10/2012 | Imoto | .................... B01J 21/066 502/351 |
| 2014/0154163 A1 | | 6/2014 | Andersen et al. | |
| 2021/0170368 A1 | * | 6/2021 | Yang | ........................ B01J 21/04 |

FOREIGN PATENT DOCUMENTS

| | | |
|---|---|---|
| CN | 101146615 A | 3/2008 |
| JP | 10328566 A | 12/1998 |
| JP | 2012215108 A | 11/2012 |
| JP | 2014100631 A | 6/2014 |

\* cited by examiner

*Primary Examiner* — Timothy C Vanoy

(57) ABSTRACT

A three-way catalyst article is provided for the treatment of exhaust gas from a positive ignition engine, the catalyst article comprising:
a substrate having a first layer provided thereon, wherein a second layer is provided on the first layer,
wherein the first layer comprises a first metal and a first alumina, and
wherein the second layer comprises a second metal and a second alumina,
wherein either (i) the first metal is Pd and the second metal is Rh; or (ii) the first metal is Rh and the second metal is Pd; and
wherein at least one of the first and second aluminas comprises theta alumina.

19 Claims, 1 Drawing Sheet

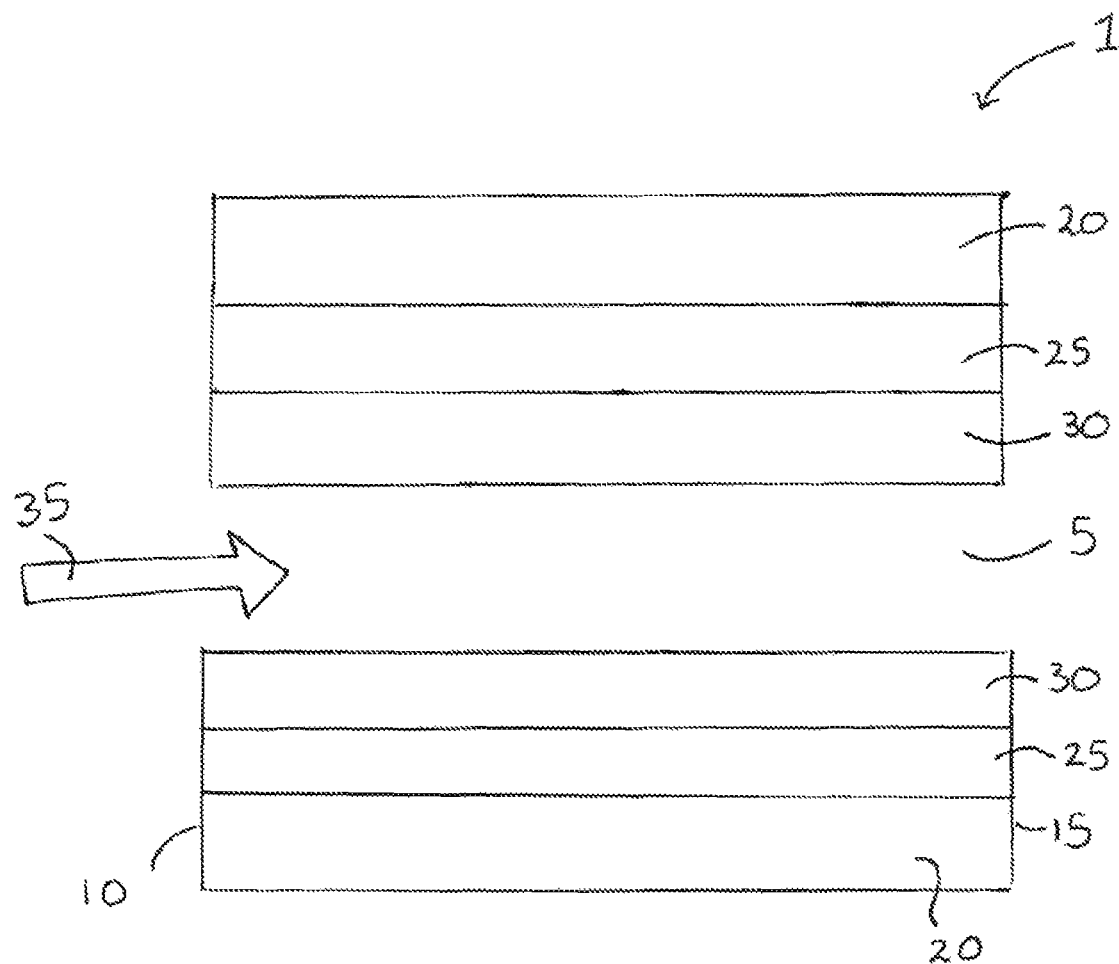

CATALYST ARTICLE, METHOD AND USE

FIELD OF THE INVENTION

This disclosure relates to a catalyst article for the treatment of an exhaust gas. In particular the disclosure relates to a TWC catalyst for treating exhaust gas from an internal combustion engine.

BACKGROUND OF THE INVENTION

Positive ignition engines cause combustion of a hydrocarbon and air mixture using spark ignition. In contrast, compression ignition engines cause combustion of a hydrocarbon by injecting the hydrocarbon into compressed air. Positive ignition engines can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

A three-way catalyst (TWC) typically contains one or more platinum group metals, particularly those selected from the group consisting of platinum, palladium and rhodium. TWCs are intended to catalyse three reactions simultaneously:

(i) oxidation of carbon monoxide to carbon dioxide,
(ii) oxidation of unburned hydrocarbons to carbon dioxide and water; and
(iii) reduction of nitrogen oxides to nitrogen and oxygen.

These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC, $H_2$ and CO) are substantially matched. The air-to-fuel ratio that produces this stoichiometrically balanced exhaust gas composition is typically given as 14.7:1.

Theoretically, it should be possible to achieve complete conversion of $O_2$, $NO_x$, CO, $H_2$, and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda ($\lambda$) value of the exhaust gas, which can be defined according to equation (1) as:

Actual engine air-to-fuel ratio/Stoichiometric engine air-to-fuel ratio, (1)

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC, $H_2$ and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium supported on a high surface area oxide, and an oxygen storage component.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

US2011/0014101 discloses a catalyst for the purification of exhaust gases from an engine. The catalyst provides a flow-through monolith coated with a washcoat. The washcoat comprises a noble metal supported on a metal oxide support. A large range of suitable metal oxide supports are disclosed, including alumina. The examples employ theta alumina, acting as a support for platinum, though no reason is given for selecting this type of alumina. The examples and disclosure of US2011/0014101 only contemplate a single layered structure.

Accordingly, it is an object to provide an improved TWC catalyst tackling the disadvantages of the prior art, or at least to provide a commercially useful alternative thereto.

SUMMARY OF THE INVENTION

One aspect of the present invention is directed to a three-way catalyst article for the treatment of exhaust gas from a positive ignition engine, the catalyst article comprising:

a substrate having a first layer provided thereon, wherein a second layer is provided on the first layer, wherein the first layer comprises a first metal and a first alumina, and wherein the second layer comprises a second metal and a second alumina, wherein either (i) the first metal is Pd and the second metal is Rh; or (ii) the first metal is Rh and the second metal is Pd; and wherein at least one of the first and second aluminas comprises theta alumina.

According to a further aspect there is provided a method of treating exhaust gas from a positive ignition engine, the method comprising contacting the exhaust gas from the positive ignition engine with the catalyst article described herein. The exhaust gas may have a temperature at the point of contact with the catalyst article in the range 300 to 1150° C., preferably 500 to 1000° C. In some embodiments, the exhaust gas may have a temperature of ≥900° C., for example ≥900 to 1050° C.

According to a further aspect there is provided a use of a three-way catalyst article comprising theta alumina for the treatment of exhaust gas from a positive ignition engine at a temperature of at least 1000° C. Preferably the catalyst article is as described herein.

According to a further aspect there is provided an exhaust gas treatment system comprising the catalyst article as described herein.

According to a further aspect there is provided a gasoline engine comprising the exhaust gas system as described herein. The engine may be a lean-burn gasoline engine or a stoichiometric-burn engine. Additionally, the present disclosure can comprise a vehicle, such as a passenger vehicle, comprising an engine as described herein.

BRIEF DESCRIPTION OF THE DRAWINGS

FIG. 1 shows a cross-section through a channel of a flow-through monolith substrate in accordance with the catalyst article of the present invention.

DETAILED DESCRIPTION OF THE INVENTION

One aspect of the present invention is directed to a three-way catalyst article for the treatment of exhaust gas from a positive ignition engine, the catalyst article comprising:

a substrate having a first layer provided thereon, wherein a second layer is provided on the first layer, wherein the first layer comprises a first metal and a first alumina, and wherein the second layer comprises a second metal and a second alumina, wherein either (i) the first metal is Pd and the second metal is Rh; or (ii) the first metal is Rh and the second metal is Pd; and wherein at least one of the first and second aluminas comprises theta alumina.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a three-way catalyst article for the treatment of exhaust gas from a positive ignition engine. A catalyst article as used herein refers to a component of an exhaust gas system, in particular a TWC catalyst for the treatment of an exhaust gas. Such catalytic articles provide a supported catalyst for the treatment of gases brought into contact with the catalyst.

Preferably the catalyst article is close-coupled. By "close-coupled" it is meant that the catalyst article is for installation in close proximity to the exhaust manifold of an engine. That is, preferably the catalyst article is for installation in the engine bay and not on the underfloor of the vehicle. Preferably the catalyst article is the first catalyst article provided downstream of the engine manifold. The close-coupled position is very hot due to proximity to the engine.

The catalyst article comprises a substrate having a first layer provided thereon, wherein a second layer is provided on the first layer.

The substrate may be configured as a flow-through substrate (e.g. a flow-through monolith substrate) wherein each passage is open at both the first and second faces of the substrate and the passage extends through the whole length of the substrate. Consequently, exhaust gases entering through a first face of the substrate into a passage pass through the substrate within the same passage until the exhaust gases exit a second face of the substrate. Alternatively, the substrate may be configured as a filter substrate (e.g. a monolithic filter substrate), in which some passages are plugged at a first face of the substrate and other passages are plugged at a second face of the substrate. In such a configuration, exhaust gases entering through a first face of the substrate into a first passage flow along that first passage part-way along the substrate and then pass through a porous filtering wall of the substrate into a second passage. The exhaust gases then pass along said second passage and out of a second face of the substrate. Such an arrangement has become known in the art as a wall-flow filter.

Typical lengths for the substrate are from 2-12 inches long (5.1-30.5 cm), preferably 3-6 inches (7.6-15.2 cm) long. Cross sections are preferably circular and may typically have 4.66 and 5.66 inch (11.8 cm and 14.4 cm) diameter filters. However, cross-section can also be dictated by space on a vehicle into which the substrate is required to fit.

The channels of the substrate are provided with the catalyst material for treating the exhaust gas. The channels may have porous walls for increasing the surface area of catalyst with which the exhaust gas can be treated. Preferably the substrate comprises cordierite, cordierite-α alumina, silicon nitride, zircon mullite, spodumene, alumina-silica magnesia, zircon silicate, sillimanite, magnesium silicate, zircon, petalite, α-alumina, or an aluminosilicate. Preferably, the substrate is porous. The substrates may have a porosity of 40 to 75%, such as 45 to 70% (e.g. 45 to 65%) or 50 to 60%.

The catalyst article comprises a substrate having a first layer provided thereon, wherein a second layer is provided on the first layer. That is, the article provides a laminate structure, as shown in FIG. 1, with the second layer on the first layer, the first layer on the substrate. The second layer may be directly on the first layer with no intervening layers. The first layer may be directly on the substrate with no intervening layers. The second layer may completely cover an upper surface of the first layer. The first layer may completely cover a surface of the substrate. In an embodiment, the first and second layers may extend for an entire length (i.e. substantially an entire length) of the substrate, particularly the entire length of the channels of a monolith substrate. Alternatively, the first and second layers may extend for only a partial length of the substrate. In another alternative, one of the first or second layers may extend for an entire length of the substrate and the other layer may extend for a partial length of the substrate (i.e. there may be a region of a substrate surface where only one of the first or second layer is present).

The first layer comprises a first metal and a first alumina. The second layer comprises a second metal and a second alumina. The first metal may be palladium or rhodium provided that: where the first metal is palladium, the second metal is rhodium; and where the first metal is rhodium the second metal is palladium. Preferably, the first metal is palladium and the second metal is rhodium. The alumina may act as a support for the platinum group metals included in each layer. In one embodiment, the first and/or second layers may additionally contain further PGMs, such as Pt.

It is desirable to separate Rh from Pd to increase activity of the TWC, which can be achieved by the use of the described two-layer structure. If the Rh and the Pd are provided together then it is believed that Pd may encapsulate the Rh and reduce its efficiency. In addition, Pd has a promotional effect on the OSC, such as Ce.

The Pd and the Rh in the catalyst article may have a weight ratio of from 200:1 to 1:200. Preferably, the Pd and the Rh has a weight ratio of from 100:1 to 1:100. More preferably, the Pd and the Rh has a weight ratio of from 50:1 to 1:50. Most preferably, the Pd and the Rh may have a weight ratio of from 15:1 to 1:15. The total PGM loading in the catalyst article is preferably 1-350 g/ft$^3$ of the PGM component, preferably, 5-150 g/ft$^3$, more preferably, 10-100 g/ft$^3$ of the PGM component.

Different types of alumina are known which have different properties, depending on the structure of the alumina. At least one of the first and second aluminas comprises theta alumina. Preferably the first alumina comprises theta alumina. More preferably the first alumina consists of theta alumina. Preferably the second alumina comprises gamma alumina. More preferably the second alumina consists of gamma alumina. In some embodiments both the first and second alumina are theta alumina.

Gamma alumina is a metastable phase with a cubic structure. Theta alumina is a metastable phase with a monoclinic structure. Methods for obtaining and identifying these phases are well known in the art.

There is a general trend among vehicle manufacturers to reduce fuel consumption, driven by legislation and cost. This has generally led to a reduction in the engine size employed for a given vehicle weight. To make up for the lower power provided by the smaller engine, it is commonplace to employ a turbocharger. Additionally, the engines are consistently being running closer to stoichiometric conditions (lambda). That is, they are not utilizing rich conditions to cool their exhaust temperatures, which was a tactic employed to reduce temperatures in the exhaust system and to thereby preserve the integrity of the exhaust system components. This is now undesirable since it increases fuel usage.

These trends mean that the conditions encountered by the components of the exhaust system have become hotter, especially for close-coupled components such as a TWC catalyst in a gasoline engine. The engine is under more stress and less is being done to moderate the temperatures encountered.

The inventors have found that catalyst articles comprising only the conventionally used gamma alumina are not sufficiently stable for use under such hot conditions. It has surprisingly been found that the incorporation of theta-alumina into a layered Pd/Rh TWC catalyst may provide a more thermally durable catalyst. Further, it has been found that such use of theta alumina provides reduced back-pressure. In particular, the inventors found that, while a theta alumina support might have a much lower surface area than a gamma alumina support when fresh, when aged at temperature at or above 1000° C., the surface area of the gamma alumina significantly decreased, while the theta alumina remained substantially unchanged.

Preferably the theta alumina has a fresh mean pore diameter of at least 20 nm, preferably from 20 to 40 nm.

Preferably the theta alumina has a particle distribution having a D50 in the range 2 to 10 μm, preferably 2 to 8 μm, more preferably 3 to 5 μm.

The particle size measurements necessary to obtain D10, D50 and D90 values are obtained by Laser Diffraction Particle Size Analysis using a Malvern Mastersizer 2000, which is a volume-based technique (i.e. D50 and D90 may also be referred to as Dv50 and Dv90 (or D(v,0.50) and D(v,0.90)) and applies a mathematical Mie theory model to determine a particle size distribution. The laser diffraction system works by determining diameters for the particles based on a spherical approximation. Diluted washcoat samples were prepared by sonication in distilled water without surfactant for 30 seconds at 35 watts.

Preferably the theta alumina has a BET surface area of from 50 m$^2$/g to 100 m$^2$/g. While this is lower than that of typically used gamma aluminas, which can exceed 200 m$^2$/g, the theta alumina is much more stable and retains substantially the same BET surface area after aging in use. This can be measured using techniques known in the art. Preferably, the theta alumina has a BET surface area after aging at 1050° C. for 10 hours of within 5% of the fresh BET surface area, and after aging at 1100° C. for 10 hours of within 10% of the fresh BET surface area.

Preferably the theta alumina is stabilised with one or more stabilising elements selected from the group consisting of La, Nd, Sr, Si, Ti, Zr, Ba, Ca and Ce. Most preferably the theta alumina is stabilized with La or Nd. Preferably the one or more stabilising element are present in a total amount by weight of the alumina of from 0.1 to 5 wt %. Most preferred is La stabilisation in an amount of from 3.5 to 4.5 wt %.

Preferably, the first metal is palladium and the first layer further comprises an alkali or alkali earth metal component, preferably wherein the alkali or alkali earth metal is barium or strontium. Preferably the barium or strontium, where present, is present in an amount of 0.1 to 15 weight percent, and more preferably 3 to 10 weight percent barium, based on the total weight of the first and or second catalyst. Preferably the barium is present as a BaCO$_3$ composite material. Such a material can be performed by any method known in the art, for example incipient wetness impregnation or spray-drying. Alternatively, barium hydroxide can be used in the catalyst article.

Preferably the first and/or second layers further comprises an OSC component. An OSC is an entity that has multivalence states and can actively react with oxidants such as oxygen or nitrous oxides under oxidative conditions, or reacts with reductants such as carbon monoxide (CO) or hydrogen under reducing conditions. Examples of suitable oxygen storage components include ceria. Praseodymia can also be included as an OSC. Delivery of an OSC to the layer can be achieved by the use of, for example, mixed oxides. For example, ceria can be delivered by a mixed oxide of cerium and zirconium, and/or a mixed oxide of cerium, zirconium, and neodymium. Preferably, the OSC comprises or consists of one or more mixed oxides. The OSC can be ceria or a mixed oxide comprising ceria. The OSC may comprise a ceria and zirconia mixed oxide; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium. Preferably the OSC of the first and second layers each independently are selected from the group consisting of cerium oxide, a ceria-zirconia mixed oxide, and an alumina-ceria-zirconia mixed oxide. A CeZr mixed oxide is most preferred. The ceria-zirconia mixed oxide can have a weight ratio of zirconia to ceria of 80:20 to 20:80, 85:15 to 15:85, more preferably 75:25 to 25:75.

Preferably the loading of OSC in the catalyst article is from 0.5 to 4 g/in$^3$, preferably from 1 to 3 g/in$^3$ and most preferably about 2.5 g/in$^3$.

The catalyst article of the invention may comprise further components that are known to the skilled person. For example, the compositions of the invention may further comprise at least one binder and/or at least one surfactant. Where a binder is present, dispersible alumina binders are preferred.

According to a further aspect there is provided a method of treating exhaust gas from a positive ignition engine, the method comprising contacting the exhaust gas from the positive ignition engine with the catalyst article described herein. The exhaust gas may have a temperature at the point of contact with the catalyst article in the range 300 to 1150° C., preferably 500 to 1000° C. In some embodiments, the exhaust gas may have a temperature of ≥900° C., for example ≥900 to 1050° C.

According to a further aspect there is provided a use of a three-way catalyst article comprising theta alumina for the treatment of exhaust gas from a positive ignition engine at a temperature of at least 1000° C. Preferably the catalyst article is as described herein.

According to a further aspect there is provided an exhaust gas treatment system comprising the catalyst article as described herein.

As desired, the exhaust system can also include additional components, such as further catalysts or filters. For example, in exhaust systems applicable particularly to gasoline engines, a NO$_x$ trap can be disposed either upstream of the catalyst article described. A NOx trap, also known as a NO$_x$ absorber catalysts (NACs), are known e.g. from U.S. Pat. No. 5,473,887 and are designed to adsorb nitrogen oxides (NO$_x$) from lean (oxygen rich) exhaust gas (lambda >1) during lean running mode operation and to desorb the NO$_x$ when the oxygen concentration in the exhaust gas is decreased (stoichiometric or rich running modes). Desorbed NO$_x$ may be reduced to N$_2$ with a suitable reductant, e.g. gasoline fuel, promoted by a catalyst component, such as rhodium or ceria, of the NAC itself or located downstream of the NAC. Examples of further components include a hydrocarbon trap, a selective catalytic reduction (SCR) catalyst, a catalysed soot filter (CSF), a selective catalytic reduction filter (SCRF™) catalyst, an ammonia slip catalyst (ASC), a gasoline particulate filter (GPF), and combinations of two or more thereof. Such components are all well known in the art.

In one embodiment, the exhaust system may comprise a first TWC catalyst and a second TWC catalyst, where one or both of the TWC catalysts comprises a catalyst article according to the present invention. In such an embodiment, both the first and second TWC catalysts may be situated in a close-coupled position.

According to a further aspect there is provided a gasoline engine comprising the exhaust gas system as described herein. The engine may be a lean-burn gasoline engine or a stoichiometric-burn engine. Additionally, the present disclosure can comprise a vehicle, such as a passenger vehicle, comprising an engine as described herein.

The invention will now be described in relation to the following non-limiting FIGURES, in which:

FIG. 1 shows a cross-section through a channel of a flow-through monolith substrate in accordance with the catalyst article described herein.

FIG. 1 shows a portion of a flow-through catalyst 1. In particular it depicts a channel 5 passing through the flow-through monolith 1 from an upstream side 10 to a downstream side 15.

The channel 5 is formed from a substrate 20, such as a cordierite honeycomb monolith. The substrate 20 is provided with a first layer 25 and a second layer 30. Relative to the substrate 20, the first layer 25 may be considered the bottom later and the second layer 30 may be considered the upper layer, relative to the exhaust gas 35 to be treated.

The first layer 25 comprises Pd and theta alumina. The second layer 30 comprises Rh and gamma alumina. The lower layer 25 further comprises an oxygen storage component, such as a CeZr mixed oxide. The upper layer further comprises an oxygen storage component, such as a CeZr mixed oxide.

In use, the exhaust gas 35 flows from the exhaust manifold of the engine (not shown) into the channel 5 of the flow-through catalyst 1. The exhaust gas contacts the components of the first and second layers 25, 30 and is treated.

EXAMPLES

The invention will now be described in relation to the following non-limiting examples.

Thermal Durability Testing

La-stabilized gamma alumina and La-stabilized theta alumina powders were subjected the aging conditions set out in Table 1 below. The BET surface area of each alumina was measured when the powder was fresh and after each aging cycle. BET surface area was determined via the N$_2$ porosity technique.

TABLE 1

| Material | Fresh, BET (m$^2$/g) | 1050° C. 10 hours in air, BET (m$^2$/g) | 1100° C. 10 hours in air, BET (m$^2$/g) | 1150° C. 10 hours in air, BET (m$^2$/g) |
| --- | --- | --- | --- | --- |
| Gamma | 207 | 129 | 105 | 85 |
| Theta | 90 | 86 | 81 | 71 |

Preparation of Catalyst Articles

Comparative Example 1

A cylindrical cordierite monolith substrate was washcoated with a first (lower) layer comprising an OSC and a palladium catalyst supported on a support comprising La-stabilized gamma alumina, and then washcoated with a second (upper) layer comprising an OSC and a rhodium catalyst supported on a support comprising La-stabilized gamma alumina. After application of each washcoat the substrate was dried and calcined. Both the first and second layers extended for the entire length of the channels of the substrate. The total loading of La-stabilized gamma alumina in the lower layer was 1.0 g/in$^3$, the total loading of La-stabilized gamma alumina in the upper layer was 0.35 g/in³, the total palladium loading in the lower layer was 83 g/ft³ and the total rhodium loading in the upper layer was 5 g/ft³ Rh.

Example 2

A catalyst article was prepared in the same manner as Comparative Example 1, except that the La-stabilized gamma-alumina of the bottom layer was substituted for 0.8 g/in³ La-stabilized theta alumina and 0.05 g/in³ binder component.

Example 3

A cylindrical cordierite substrate was washcoated with a first (lower) layer comprising an OSC (different than Comparative Example 1 and Example 2) and a palladium catalyst supported on a support comprising La-stabilized theta alumina and a minor quantity of binder component, and then washcoated with a second (upper) layer comprising an OSC and a rhodium catalyst supported on a support comprising La-stabilized theta alumina and a minor quantity of binder component. After application of each washcoat the substrate was dried and calcined. The total loading of La-stabilized theta alumina in the lower layer was 0.8 g/in³ and the total loading of binder component in the lower layer was 0.1 g/in³. The total loading of La-stabilized theta alumina in the upper layer was 0.25 g/in³ and the total loading of binder component in the upper layer was 0.1 g/in³. The total palladium loading in the lower layer was 83 g/ft³ and the total rhodium loading in the upper layer was 5 g/ft³ Rh.

Example 4

A catalyst article was prepared in the same manner as Example 3, except the La-stabilized theta-alumina and binder component of the upper layer were substituted for 0.35 of La-stabilized gamma alumina.

Backpressure Testing

The catalyst articles of Examples 2, 3, and 4 and Comparative Example 1 were subjected to backpressure testing using a commercially available flow bench. The results are set out in Table 2 below.

TABLE 2

| Example | Inches of Water @173 cfm | Inches of Water @200 cfm | Inches of Water @300 cfm | Inches of Water @600 cfm |
|---|---|---|---|---|
| 1 | 42.72 | 45.02 | 43.45 | Not tested |
| 2 | 32.20 | 32.75 | 32.66 | 30.96 |
| 3 | 37.2 | 37.3 | 37.1 | 34.4 |
| 4 | 36.7 | 36.7 | 36.9 | 35.7 |

In conclusion, these examples show that replacement of gamma alumina with a theta alumina, in a layer of a TWC (e.g. a lower layer), can reduce backpressure (BkP) contribution from the catalytic coating by ~25% of the original formulation.

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A three-way catalyst article for the treatment of exhaust gas from a positive ignition engine, the catalyst article comprising:
   a substrate having a first layer provided thereon, wherein a second layer is provided on the first layer,
   wherein the first layer comprises a first metal and a first alumina, and
   wherein the second layer comprises a second metal and a second alumina,
   wherein either (i) the first metal is Pd and the second metal is Rh; or (ii) the first metal is Rh and the second metal is Pd;
   wherein at least one of the first and second aluminas comprises theta alumina; and
   wherein the first alumina comprises theta alumina.

2. The three-way catalyst article according to claim 1, wherein the first metal is Pd and the second metal is rhodium.

3. The three-way catalyst article according to claim 1, wherein the second alumina comprises gamma alumina.

4. The three-way catalyst article according to claim 1, wherein the theta alumina has a fresh mean pore diameter of at least 20 nm.

5. The three-way catalyst article according to claim 1, wherein the theta alumina has an aged BET surface area within 5% of the fresh BET surface area after aging at 1050° C. for 10 hours.

6. The three-way catalyst article according to claim 1, wherein the theta alumina is stabilised with one or more stabilising elements selected from the group consisting of La, Nd, Sr, Si, Ti, Zr, Ba, Ca and Ce.

7. The three-way catalyst article according to claim 6, wherein the one or more stabilising element are present in a total amount by weight of the alumina of from 0.1 to 5 wt %.

8. The three-way catalyst article according to claim 1, wherein the first metal is Pd and the first layer further comprises an alkali or alkali earth metal component.

9. The three-way catalyst article according to claim 8, wherein the alkali or alkali earth metal is barium and/or strontium.

10. The three-way catalyst article according to claim 1, wherein the first and/or second layers further comprises an oxygen storage component.

11. The three-way catalyst article according to claim 1, wherein the catalyst article is close-coupled.

12. The three-way catalyst article according to claim 1, wherein the substrate is a flow through monolith.

13. A method of treating exhaust gas from a positive ignition engine, the method comprising contacting the exhaust gas with the catalyst article of claim 1.

14. The method as claimed in claim 13 wherein the exhaust gas has a temperature in the range 300 to 1050° C.

15. The method as claimed in claim 14 wherein the exhaust gas has a temperature in the range ≥900 to 1050° C.

16. An exhaust gas treatment system comprising the catalyst article of claim 1.

17. The three-way catalyst article according to claim 4, wherein the theta alumina has a fresh mean pore diameter of from 20 to 40 nm.

18. A three-way catalyst article for the treatment of exhaust gas from a positive ignition engine, the catalyst article comprising:
   a substrate having a first layer provided thereon, wherein a second layer is provided on the first layer,
   wherein the first layer comprises a first metal and a first alumina, and wherein the second layer comprises a second metal and a second alumina, wherein either (i) the first metal is Pd and the second metal is Rh; or (ii) the first metal is Rh and the second metal is Pd;

wherein at least one of the first and second aluminas comprises theta alumina; and wherein the second alumina comprises gamma alumina.

19. A three-way catalyst article for the treatment of exhaust gas from a positive ignition engine, the catalyst article comprising:

a substrate having a first layer provided thereon, wherein a second layer is provided on the first layer, wherein the first layer comprises a first metal and a first alumina, and wherein the second layer comprises a second metal and a second alumina, wherein either (i) the first metal is Pd and the second metal is Rh; or (ii) the first metal is Rh and the second metal is Pd;

wherein at least one of the first and second aluminas comprises theta alumina;

wherein the theta alumina is stabilised with one or more stabilising elements selected from the group consisting of La, Nd, Sr, Si, Ti, Zr, Ba, Ca and Ce; and wherein the one or more stabilising element are present in a total amount by weight of the alumina of from 0.1 to 5 wt %.

* * * * *